Patented Aug. 8, 1944

2,355,497

UNITED STATES PATENT OFFICE 2,355,497

DIOXAZINE COLORING MATTERS AND PROCESS FOR PREPARING THE SAME

Frithjof Zwilgmeyer, Wilmington, Del., assignor to E. I. du Pont de Nemours & Company, Wilmington, Del., a corporation of Delaware No Drawing. Application February 20, 1943, Serial No. 476,647

8 Claims. (Cl. 260—246)

This invention relates to novel dioxazine coloring matters. More particularly, this invention deals with novel compounds of the dioxazine series, characterized by the presence of sulfonamide radicals in the structural formula.

It is an object of this invention to provide novel coloring matters of the dioxazine series. Another object is to provide dioxazine dyestuffs of superior affinity to various fibers and of increased solubility in various solvents, thereby permitting the utilization of this type of color in many applications heretofore impossible. A still further object is the preparation of new blue dioxazine dyestuffs of very desirable shade, which have good solubility, exhaust, strength, and excellent fastness properties. Other and further important objects of this invention will appear as the description proceeds.

Now, according to this invention, I have found that dioxazine coloring matters having the desirable properties above indicated may be obtained by introducing sulfonamide radicals into the molecule of the color. More particularly, I introduce the sulfonamide radical into the aryl radical of the arylamine which is condensed with the central quinone nucleus and ring-closed to form the two oxazine rings. The nitrogen atom of the sulfonamide radicals may be substituted by hydrogen or various organic radicals, and the aryl nucleus containing the sulfonamide radical may possess in addition various auxochromic or chromophoric substituents, such as halogen, hydroxy, amino, alkoxy, etc. In addition, the entire molecule may carry sulfonic acid groups.

Accordingly, the novel compounds of this invention may be characterized by the general formula:

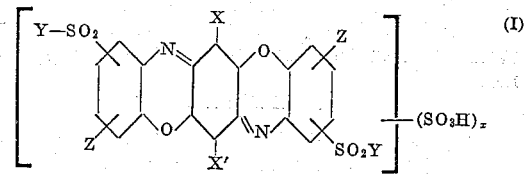

wherein X and X' individually represent a substituent from the group consisting of hydrogen, halogen and alkyl; Y represents an amine radical, such as NH, NHR, or

R and R' being any organic radicals whatsoever; Z is a substituent from the group consisting of hydrogen, halogen, hydroxy, amino, OR, NHR,

R and R' being any organic radicals whatsoever; in other words, Z is a substituent from the group consisting of hydrogen, halogen, hydroxy, amino, substituted hydroxy and substituted amino; finally, $x$ is a numeral which may have a value anywhere from zero to 4.

The properties of the dioxazine compound may to some extent be controlled by proper choice of the substituents Y and Z in the above formula. For instance, if either of these is an organic radical having sulfo or carboxy groups, the product will have increased water-solubility. By choosing Y or Z so as to possess ethanol, methanol or glycolether radicals, the resulting dioxazine compound may be endowed with solubility in alcohol. Affinity for cotton may be increased by choosing an amino benzazole radical, for instance the radical of a 5-amino-benzamidazolone, for Y or Z. On the other hand, aryl radicals having primary amino groups ($NH_2$), tend to give improved affinity for wool.

The synthesis of my novel series of compounds may be effected, according to my preferred mode of procedure, by starting with a halogen-nitro-benzene-sulfonyl chloride having at least one position free ortho to the $NO_2$ group, and converting the sulfonyl chloride radical into a sulfonamide radical by reaction with ammonia or with any desirable ammonia-substitution derivative. The nuclear halogen atom may likewise be exchanged for any suitable organic radicals by steps of procedure which are per se well known. The resulting nitrobenzene sulfonamide compound of general formula

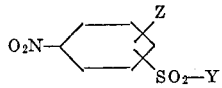
(II)

is then reduced to the corresponding amine, for instance by treatment with iron and acid, and the amine is then condensed, in ratio of 2 mols to one, with an optional quinone such as benzoquinone, toluquinone, dichloro-benzoquinone, tetrachloro-benzoquinone (chloranil), or tetrabromo-benzoquinone, giving an intermediate tri-aryldiamine of the general formula

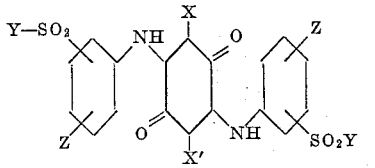
(III)

wherein X, X', Y and Z have the same significance as above.

This intermediate is then ring-closed in standard manner, for instance by treatment with oleum, chlorosulfonic acid or concentrated sulfuric acid.

The last mentioned treatment for ring-closure is generally accompanied by sulfonation, and in the subsequent treatment of the product some desulfonation or shifting of the $SO_3H$ groups takes place, as a result of which the exact number of the $SO_3H$ groups and their positions are uncertain. It is believed, however, that $x$ in the above formula (I) is in any event not greater than 4.

In some cases, the ring-closure step may be followed by a special after-treatment step with anhydrous HCl (or NaCl+anhydrous $H_2SO_4$) at elevated temperature, as more fully illustrated in Example 1 below. I find that this step enhances the exhausting properties of the final dyestuff, and give altogether greater tinctorial strength and washing fastness.

The following examples will further illustrate my preferred mode of operation, without however limiting this invention to the details set forth. Parts mentioned are by weight.

*EXAMPLE 1*

PART A—PREPARATION OF THE INTERMEDIATE 366 parts of the 4-nitro-1-chlorobenzene-2-sulfonyl chloride (Ann. 265, 91; Ber. 24, 3196) are heated at reflux with 62 parts of monoethanolamine and 82 parts of sodium acetate in 2000 parts of water for 16 hours. The reaction mass is cooled and the resulting 4-nitro-1-chlorobenzene-2-beta-hydroxy-ethylamino-sulfone is filtered off, washed and dried.

110 parts of this intermediate are then condensed with 60 parts of 5-amino-benzimidazolone (see Example 1 of my copending application, Serial No. 393,483, Patent No. 2,336,664) by heating an aqueous solution of the two intermediates, made slightly alkaline to Brilliant Yellow with soda ash, in a sealed vessel in the presence of 10 parts of magnesium oxide for 24 hours, at temperatures varying from 130 to 142° C. The reaction mixture is made alkaline with caustic soda and filtered. The filtrate is neutralized with hydrochloric acid and the separated nitro-diarylamine compound of the formula

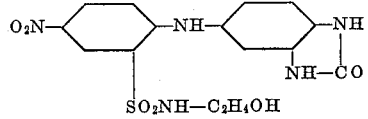

is filtered off and washed with water.

The last named nitro body is now subjected to reduction by heating at the boil with 80 parts of iron, 10 parts of concentrated hydrochloric acid and 300 parts of water. The mass is now made alkaline to Clayton Yellow by the aid of sodium hydroxide, filtered, and the filtrate is acidified with acetic acid to precipitate the amino body. The latter is then filtered off, washed free of acid and dried.

PART B—PREPARATION OF THE DYESTUFF 60 parts of the amino-diaryl-amine resulting from Part A are condensed with 20 parts of tetrachloro-benzoquinone (chloranil), by refluxing a mixture of the two in alcohol, in the presence of 14 parts of anhydrous sodium acetate or 15 parts of sodium bicarbonate, for 16 hours. The reaction product is filtered hot and the cake is washed with 50 parts of hot alcohol and then dried. 70 parts of a dark condensation product are thus obtained.

5 parts of the above dark condensation product are now added slowly to 100 parts of fuming sulfuric acid, containing 20% sulfuric anhydride, at 23-25° C. and kept there for three hours, whereupon the temperature is raised to 45° C. and kept there for one hour. The reaction mixture is added to ice and the formed dyestuff is filtered off and washed with an aqueous sodium chloride solution until the cake is free of any mineral acidity. The wet filter cake is slurried in water, neutralized with soda ash, salted out, and filtered. After drying, the dye is obtained in good yield as a purple product. It dyes animal and vegetable fibers in bright blue tints of good light fastness.

If a redder shade of blue is desired, the following alternate methods may be used: Instead of raising the temperature to 45° C. as in the preceding paragraph, the reaction mixture may be diluted with sulfuric acid to obtain finally a monohydrate solution; or, the dye may first be isolated, dried and then added to monohydrate. In the former case the addition of some sodium chloride is preferable. In both cases, the reaction mixture is kept at 50-100° C. for about one hour, drowned in ice and isolated in the above-described manner. Noticeably redder shades of blue are obtained by this treatment at higher temperature. Similar redder shades of blue are obtained by substituting 30% oleum for the 20% oleum in the above samples. The yields are, in all cases, about the same.

A similar dye is obtained by using chlorosulfonic acid instead of the oleum in the above example. This dye may be redissolved in monohydrate at temperatures from 65° to 100° C., as in the above example, and isolated in the same manner, resulting in similar shade improvements.

*EXAMPLE 2*

5 parts of the dark condensation product, as obtained after condensing with chloranil in Part B of Example 1, are added to 100 parts of sulfuric acid monohydrate; the reaction mixture is heated to 150° C., held there for one-half hour, and isolated as a sodium salt as in Example 1. The dye is obtained in good yield as a dark powder. It dyes animal and vegetable fibers bluish-gray tints of good light fastness.

EXAMPLE 3

Example 1 is repeated, except that the tetrachloro-benzoquinone in Part B is replaced by the molecular equivalent of toluquinone. The dye is obtained in good yield as a dark purple powder. It dyes animal and vegetable fibers bluish-gray tints of good light fastness.

EXAMPLE 4

Example 1 is repeated, except that the tetrachloro-benzoquinone is replaced by the equivalent weight of benzoquinone. The dye is obtained in good yield as a dark powder. It dyes animal and vegetable fibers bluish-gray tints of good light fastness.

EXAMPLE 5

Example 1 is repeated, except that the tetrachloro-benzoquinone is replaced by the equivalent weight of 2:5-dichloro-benzoquinone. The dye is obtained in good yield as a dark powder. It dyes animal and vegetable fibers bright blue tints of good light fastness.

EXAMPLE 6

Example 1 is repeated, except that the tetrachloro-benzoquinone is replaced by the equivalent weight of tetrabromo-benzoquinone. The dye is obtained in good yield as a dark powder. It dyes animal and vegetable fibers blue tints of good light fastness.

It will be understood that the above examples are merely illustrative and that numerous variations in the details thereof may be practiced without departing from the spirit of this invention. For instance, instead of using chloro-benzoquinones or toluquinones, longer-chain alkylated benzoquinones may be employed. Likewise, instead of the amino-diaryl amine specified in Example 1 for condensation with the quinone, other aryl amines of the general formula

(IV)

may be employed, wherein Y and Z may signify substituents as defined in the introductory parts of this specification. Typical additional illustrations of such intermediates synthesized by me, and the shades of the resulting dioxazine dyestuffs upon cotton are given in Tables A and B, below.

In all cases of Table A, I have started with 4-nitro-1-chlorobenzene-2-sulfonyl-chloride; condensed same with an ammonia derivatives,

as given in the table; condensed the produce further with 4-amino-2-benzimidazolone; reduced $NO_2$ group in resulting diarylamine; condensed 2 moles of the resulting amino-diarylamine with 1 mole of chloranil, and finally ring-closed by aid of oleum according to Example 1 above. The resulting dioxazine dyestuff was then dyed upon cotton.

Table A

[Z=5-amino-2-benzimidazolone; Y=variable]

| | Ammonia derivative employed to furnish radical Y | Formula of ammonia derivative: 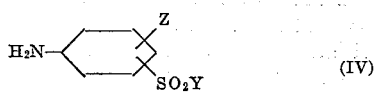 | Shade of dioxazine dye upon cotton |
|---|---|---|---|
| 1 | Ammonia | $NH_3$ | Reddish-blue. |
| 2 | Dimethylamine | $HN(CH_3)_2$ | Do. |
| 3 | Sulfanilic acid | $H_2N-\!\!\bigcirc\!\!-SO_3H$ | Greenish-blue. |
| 4 | 2,5-dichloro-aniline. | $H_2N-\!\!\bigcirc\!\!-$ (Cl, Cl) | Do. |
| 5 | 2,5-dichloro-p-toluidine. | $H_2N-\!\!\bigcirc\!\!-CH_3$ (Cl, Cl) | Do. |
| 6 | 2,4,5-trichloro-aniline. | $H_2N-\!\!\bigcirc\!\!-Cl$ (Cl, Cl) | Do. |
| 7 | 5-amino-2-benzimidazolone. | $H_2N-\!\!\bigcirc\!\!-NH-CO-NH$ | Dark blue. |
| 8 | N-ethyl-alpha-naphthylamine | $C_2H_5-NH-\!\!\bigcirc\!\!\bigcirc$ | Do. |

In Table B, I have started likewise in all cases with 4-nitro-1-chlorobenzene-2-sulfonyl chloride; condensed same first with monoethanolamine according to Example 1; condensed the product further with an ammonia derivative of formula $$HN\!\!\begin{array}{c}R\\ \diagdown\\ R'\end{array}$$

as given in the table; reduced $NO_2$ group in resulting 1-substituted-4-nitrobenzene-2-beta-hydroxy-ethylamino-sulfone; condensed 2 moles of resulting amine with 1 mole of chloranil, and finally ring-closed by aid of oleum according to Example 1 above. The dioxazine dyestuff thus obtained was dyed upon cotton.

Table B

[Y=monoethanol-amine; Z=variable]

| | Ammonia derivative employed to furnish radical Z | Formula of ammonia derivative: $HN\!\!<\!\!{}^R_{R'}$ | Shade of dioxazine dye upon cotton |
|---|---|---|---|
| 1 | Ammonia | $NH_3$ | Reddish-blue. |
| 2 | Ethanolamine | $H_2N-C_2H_4OH$ | Do. |
| 3 | Hexamethylene-diamine. | $H_2N-(CH_2)_6-NH_2$ | Do. |
| 4 | N,N-dimethyl-hexamethylene-diamine. | $H_2N-(CH_2)_6-N(CH_3)_2$ | Do. |
| 5 | Aniline | $H_2N-\!\!\bigcirc$ | Blue. |

In a similar manner other sulfonamide containing arylamines may be synthesized for condensation with chloranil or similar quinone to give eventually novel dioxazine dyestuffs which, besides showing in most cases extraordinary good cotton affinity and excellent light fastness, may also be of interest for other fibers, since it is possible to select the groups connected to the sulfone radical or to the aryl radical so as to obtain good affinity on specific fibers and to render the dyes soluble in solvents in which ordinary dioxazine compounds are only sparingly soluble or not soluble at all. Additional typical illustrations of such intermediates and their preferred mode of synthesis are given in Tables C and D below.

Table C

[Z=Cl, Y=variable]

All compounds in this table may be prepared by condensing 4-nitro-1-chlorobenzene-2-sulfonyl-chloride with an ammonia derivative as indicated, and then reducing the nitro group.

| | Arylamine-sulfonamide intermediate | Ammonia derivative used to furnish radical Y |
|---|---|---|
| 1 | $NH_2$—⟨⟩—Cl <br> $SO_2NH_2$ | Ammonia. |
| 2 | $NH_2$—⟨⟩—Cl <br> $SO_2$—$N(CH_3)_2$ | Dimethylamine. |
| 3 | $NH_2$—⟨⟩—Cl <br> $SO_2$—NH—$C_2H_4OH$ | Monoethanolamine. |
| 4 | $NH_2$—⟨⟩—Cl <br> $SO_2$—NH—⟨⟩ | Aniline. |
| 5 | $NH_2$—⟨⟩—Cl   Cl <br> $SO_2$—NH—⟨⟩ <br>          Cl | 2,5-dichloroaniline. |
| 6 | $NH_2$—⟨⟩—Cl <br> $SO_2$—NH—⟨⟩—NH <br>            NH—CO | 5-amino-2-benzimidazolone. |
| 7 | $NH_2$—⟨⟩—Cl <br> $SO_2$—NH—⟨⟩—N <br>           NH—C—$CH_3$ | 5-amino-2-methyl-benzimidazole. |

Table D

[Z=Br, CN or $OCH_3$; Y=variable]

All compounds in this table may be prepared by condensing 4-nitro-1-chlorobenzene-2-sulfonyl-chloride with an amine as indicated, to furnish the Y substituent; the intermediate is then heated with ammonia under pressure in the presence of magnesium oxide to replace the Cl in the 1-position by $NH_2$. The resulting amine is then subjected to the Sandmeyer reaction to replace the $NH_2$ group by bromine, cyanogen or hydroxy. In the last mentioned case, the hydroxy group is then methylated. In all cases, the process is followed by reduction of the nitro group to the corresponding amine.

| | | |
|---|---|---|
| 1 | $NH_2$—⟨⟩—Br <br> $SO_2$—NH—⟨⟩ | Condense initial material with aniline, then with ammonia; Sandmeyer and reduce nitro group. |
| 2 | $NH_2$—⟨⟩—CN <br> $SO_2$—$N(CH_3)_2$ | Condense initial material with dimethyl amine, then with ammonia; Sandmeyer with KCN and reduce nitro group |
| 3 | $NH_2$—⟨⟩—CN <br> $SO_2$—NH—⟨⟩ | Like above, but condense with aniline and then with ammonia. |
| 4 | $NH_2$—⟨⟩—$OCH_3$ <br> $SO_2$—NH—⟨⟩ | Condense initial material with aniline and then with ammonia; Sandmeyer to OH compound; methylate, and reduce nitro group. |

In the preceding examples and tables, the arylamine intermediate selected for condensation with the central quinone (formula IV above) had both its positions ortho to the $NH_2$ group free (that is, substituted only by hydrogen). In some cases it is permissible to start with arylamine-intermediates in which one of the positions ortho to the $NH_2$ group is occupied; this is especially true when the substituent in the ortho position is of a nature as to be eliminated during the ring-closure step in the form of alcohol ($OCH_3$, $OC_2H_5$ group, etc.).

EXAMPLE 7

2-amino-anisole-4-sulfone-dimethylamide (described in U. S. P. 1,678,599) was condensed with chloranil (in molar ratio 2:1) and ring-closed with sulfuric acid monohydrate at 150° C. according to the procedure set forth in Example 2 above. The resulting dioxazine dyestuff dyed cotton a reddish brown shade.

The ring closure in this case presumably is attended by the limination of alcohol, according to the following scheme:

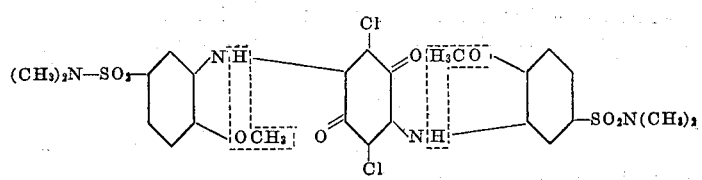

Similar results are obtained if the 4-sulfone-dimethylamide compound above is replaced by any other intermediate of the general formula

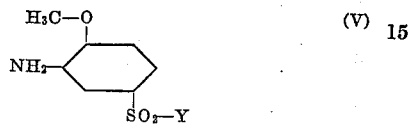

wherein Y may have any of the values indicated in the tables above.

It will be clear that my invention opens the gate to a large series of new dioxazine colors in which numerous dyestuffs of desirable shade and excellent light fastness may be produced by judicious selection of the initial components for condensation.

I claim as my invention:

1. Dioxazine dyestuffs of the general formula

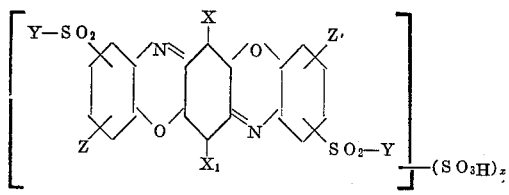

wherein X and X' individually represent a substituent from the group consisting of hydrogen, halogen and alkyl; Y represents an amine radical; Z represents a substituent selected from the group consisting of hydrogen, halogen, hydroxyl, amino, substituted hydroxy and substituted amino; while $x$ is a numeral not greater than 4.

2. Dioxazine dyestuffs of the general formula

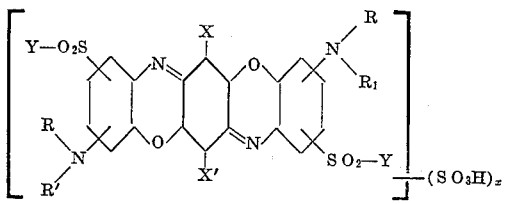

wherein X and X' individually represent a substituent from the group consisting of hydrogen, halogen and alkyl; Y represents an amine radical; the group

represents an amine radical from the group consisting of unsubstituted, monosubstituted and disubstituted amine radicals, while $x$ stands for a numeral not greater than 4.

3. A dioxazine dyestuff of the formula

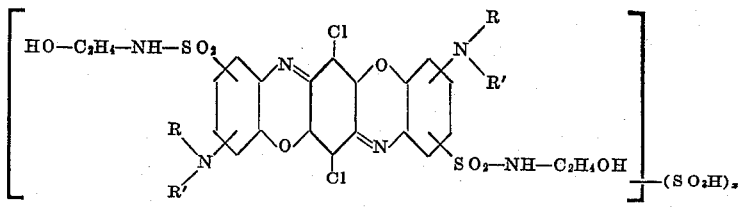

wherein the group

represents an amine radical from the group consisting of unsubstituted, monosubstituted and disubstituted amine radicals, while $x$ stands for a numeral not greater than 4.

4. A dioxazine dyestuff of the formula

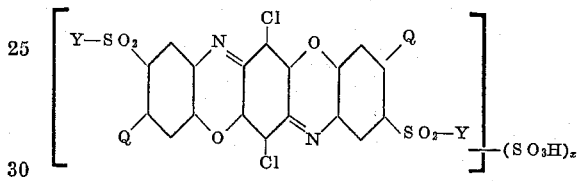

wherein Q designates the radical of 5-amino-2-benzimidazolone, Y is an amine radical from the group consisting of unsubstituted, monosubstituted and disubstituted amine radicals, while $x$ stands for a numeral not greater than 4.

5. A dioxazine dyestuff as in claim 4, wherein Y stands for the radical, NH—C$_2$H$_4$OH, of mono-ethanol-amine.

6. A dioxazine dyestuff as in claim 4, wherein Y stands for the radical, NH—C$_6$H$_4$—SO$_3$H, of sulfanilic acid.

7. The dioxazine dyestuff of formula

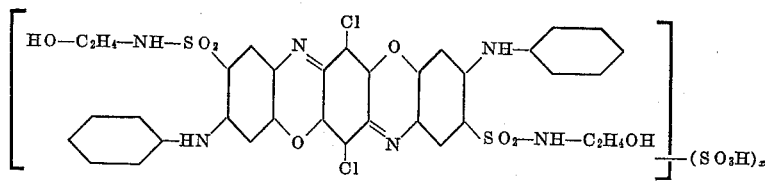

wherein $x$ is a numeral not greater than 4.

8. The process of producing a dioxazine dyestuff which comprises condensing a benzoquinone with two molar proportions of a substituted aniline having at least one ortho position free and containing in the nucleus a sulfonamide substituent of the formula —SO$_2$—Y, wherein Y is an amine radical; and reacting upon the intermediate quinone-diamine thus formed with an agent of the group consisting of sulfuric acid, oleum and chlorosulfonic acid, whereby to close the rings adjacent to the quinone nucleus.

FRITHJOF ZWILGMEYER.

CERTIFICATE OF CORRECTION.

Patent No. 2,355,497. August 8, 1944.

FRITHJOF ZWILGMEYER.

It is hereby certified that error appears in the printed specification of the above numbered patent requiring correction as follows: Page 3, first column, line 68, for the word "produce" read --product--; line 69, for "4-amino" read --5-amino--; and that the said Letters Patent should be read with this correction therein that the same may conform to the record of the case in the Patent Office.

Signed and sealed this 26th day of September, A. D. 1944.

Leslie Frazer (Seal) Acting Commissioner of Patents.